Figure 1:
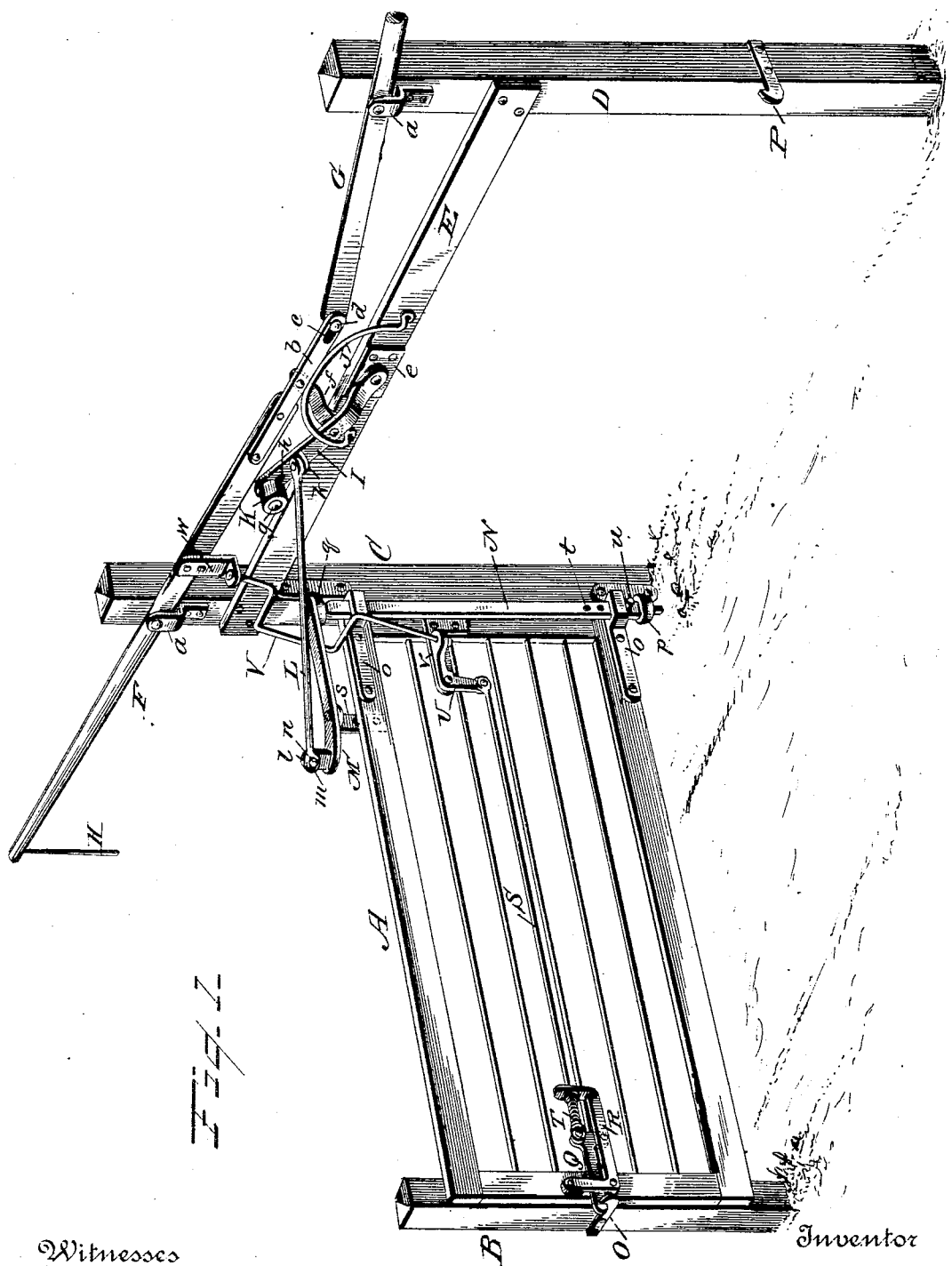

No. 685,798. Patented Nov. 5, 1901.
E. ROBERTSON.
FARM GATE.
(Application filed Aug. 3, 1901.)
(No Model.) 2 Sheets—Sheet 1.

Witnesses
C. J. Williamson
Chas. R. Goodwin

Inventor
Edwin Robertson
per Chas. H. Fowler
Attorney

No. 685,798. Patented Nov. 5, 1901.
E. ROBERTSON.
FARM GATE.
(Application filed Aug. 3, 1901.)
(No Model.) 2 Sheets—Sheet 2.

Witnesses
C. J. Williamson
Chas. R. Goodwin

Inventor
Edwin Robertson,
per Chas. H. Fowler
Attorney

THE NORRIS PETERS CO., PHOTO-LITHO., WASHINGTON, D. C.

UNITED STATES PATENT OFFICE.

EDWIN ROBERTSON, OF FAIRMOUNT, ILLINOIS.

FARM-GATE.

SPECIFICATION forming part of Letters Patent No. 685,798, dated November 5, 1901.

Application filed August 3, 1901. Serial No. 70,789. (No model.)

*To all whom it may concern:*

Be it known that I, EDWIN ROBERTSON, a citizen of the United States, residing at Fairmount, in the county of Vermilion and State of Illinois, have invented certain new and useful Improvements in Farm-Gates; and I do hereby declare that the following is a full, clear, and exact description of the same, reference being had to the annexed drawings, making a part of this specification, and to the letters of reference marked thereon.

The present invention has for its object to provide a swinging farm-gate that will possess strength and durability, easily operated, and provided with means that will be effective in opening or closing the gate; and it consists in a farm-gate and the operating mechanism therefor constructed substantially as shown in the drawings and hereinafter described and claimed.

Figure 2:
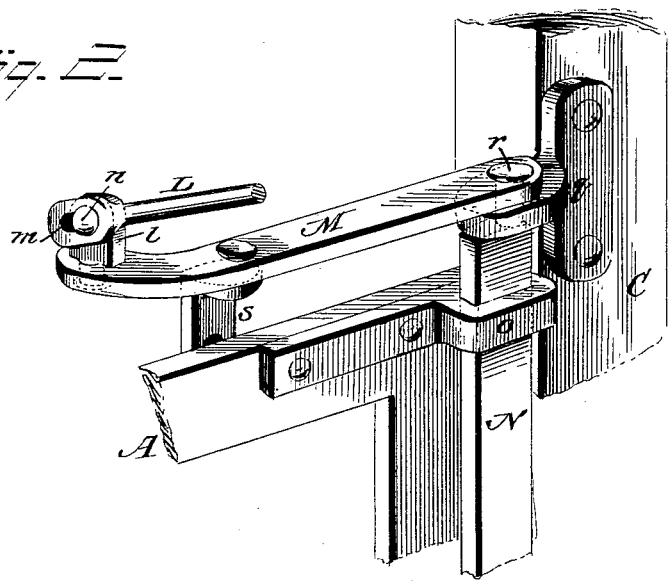
Figure 3:
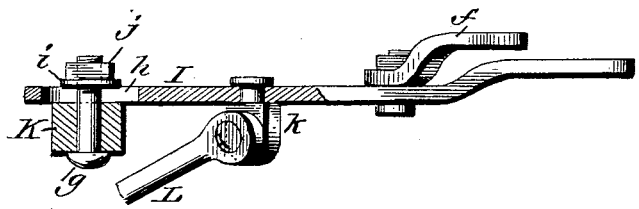
Figure 4:
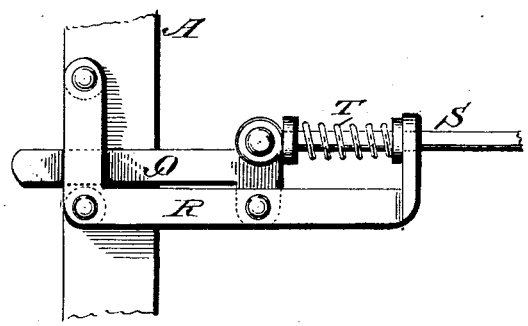

Figure 1 of the drawings is a perspective view of a swinging farm-gate embodying my invention; Fig. 2, a detail view in perspective and on an enlarged scale, showing the connection between the gate and gate-post; Fig. 3, a detail view, partly in section, of the throw-bar and its connections; Fig. 4, a detail view showing the outer end of the gate with the spring-actuated latch connected thereto.

In the accompanying drawings, A represents the gate, of any preferred construction, and B the outer gate-post, to which the gate is latched, as shown in Fig. 1 of the drawings, when in a closed position. Two vertical and parallel gate-posts C D are located the desired distance apart, so that when the gate is swung open and against the post D it will latch itself thereto and be held in an open position, said gate being swingably connected to the post C. A supporting-brace E connects the two gate-posts C D, and pivotally connected to the posts, near their upper ends, are operating-levers F G, which may be provided with chains or cords depending from the levers for convenience in operating them in the usual manner. I have only shown a portion of one of said cords, as indicated at H in Fig. 1 of the drawings, as any suitable means may be provided for operating the levers, and the levers may be of any suitable form and construction and pivoted to the posts by means of the brackets $a$ or by any other desirable means as found best adapted to the purpose.

The inner ends of the two levers F G are connected by a strap $b$, having an elongated slot $c$ near one end and connected to the lever G by means of a headed pin $d$, which pin is rigidly connected to the lever, said slot and pin forming a pivotal connection between the levers that will admit of the levers being successfully operated by pulling down upon the chains or cords connecting with said levers.

A throw-bar I is pivotally connected to a wearing-plate $e$ upon the supporting-brace E, said throw-bar connecting with the levers F G through the medium of the link $f$, which link is pivotally connected to the throw-bar and to the strap $b$, a bow-guide J holding the throw-bar in place when it is being operated.

The throw-bar I, which throws the gate open or closed, is provided with an adjustable weight K in order to balance the levers F G, said weight being of any suitable form and adjustably connected to the throw-bar by means of the bolt $g$, extending through the weight and through an elongated slot $h$ in the bar, a washer $i$ and nut $j$ engaging the screw-threaded end of the bolt to hold the weight in its adjusted position, as shown in Fig. 3 of the drawings.

I do not wish to be confined to any particular form or shape of weight or to any special means for rendering the weight adjustable, and any suitable form of throw-bar and guide therefor may be used without departing from the spirit of my invention.

A pitman-rod L is pivotally connected at one end to a lug $k$, which lug is pivotally connected in any suitable manner to the throw-bar I, as shown in Fig. 3 of the drawings. The opposite end of the pitman-rod L is pivoted to a similar lug $l$ on the end of a crank-arm M, which lug is also pivoted to its connection, the end of the pitman-rod having an elongated slot $m$, through which the pivot-pin $n$ extends, as shown in Fig. 2 of the drawings. The two lugs $k$ $l$ being pivoted to their supports and the pitman-rod L pivoted to the lugs and to one of said lugs by means of the elongated slot m and pin n, a perfectly-operating connection is provided between the crank-arm M and the throw-bar I that will insure a perfect action of the parts in throwing open or closing the gate.

The gate A may be pivotally connected or hinged to the post C in any suitable manner; but I prefer to employ a flat-sided hanger-bar N, engaging correspondingly-formed holes in suitable clips o, secured to the inner end of the gate. This hanger-bar N being stationary with relation to the gate and moving with it forms a pivot connection between the gate and the gate-post, the ends of said bar being reduced to form pivot-pins, the lower one of said pins being supported in a suitable bracket p, secured to the gate-post, and the upper one of said pins or reduced ends of the bar being loosely connected to a bracket q, also secured to the gate-post. To the upper reduced end of the hanger-bar, as shown at r in Fig. 2 of the drawings, is loosely connected the crank-arm M, said crank-arm being pivotally connected to the bracket s, which bracket may be adjustably connected to the gate A to adapt it to the position of the crank-arm M.

The hanger-bar N near its lower end has a series of holes t to receive a supporting-pin u, so that the height of the gate may be regulated or adjusted as circumstances require.

The gate-posts B D are provided with keepers O P, respectively, which engage with the latch Q to hold the gate either closed or opened, said latch being pivoted to a bracket R, secured to the gate A and having connected thereto a rod S for operating the latch. The latch Q is spring-actuated or held in its normal position by a suitable spring T, and any spring-actuated latch may be substituted for that shown and any suitable bracket employed for supporting the latch. The rod S has its respective ends pivoted to the latch and to a bell-crank U, which bell-crank is pivoted to a bracket v, secured to the gate. The bell-crank U connects with the operating-lever F through the medium of a crank or other suitable rod V, which rod connects with the lever by means of the bracket w, secured to said lever, the rod loosely connecting with the bell-crank and the bracket, so that by pulling down upon the lever F the latch Q will be released from its keeper, and through the connecting mechanism hereinbefore described between the levers and gate the gate will be thrown open and back to engage with the keeper on the post D. The lever G operates to release the latch from the keeper P and engage it with the keeper O when the gate is swung to a closed position, as shown in Fig. 1 of the drawings.

Having now fully described my invention, what I claim as new, and desire to secure by Letters Patent, is—

1. A swinging gate and means for operating the same, comprising pivoted operating-levers and means for connecting them together, a pivoted throw-bar and a weight adjustably connected thereto, means for connecting the throw-bar with the pivoted operating-levers, a crank-arm connecting with the gate, lugs pivotally connected to the throw-bar and to the crank-arm, and a pitman-rod pivotally connected to the pivoted lugs, substantially as and for the purpose described.

2. A swinging gate and means for operating the same, comprising pivoted operating-levers, a strap rigidly connected to one of the levers and connected to the opposite lever by a slot and pin, a pivoted throw-bar provided with an adjustable weight, a link pivotally connected to the strap and to the throw-bar, a suitable guide for the throw-bar, a crank-arm connecting with the gate, and a pitman-rod connecting the crank-arm with the throw-bar, substantially as and for the purpose specified.

3. A swinging gate vertically adjustable upon a hanger-bar which forms the pivotal or hinged connection between the gate and gate-post, a crank-arm engaging the pivotal connection of the gate, a pivoted throw-bar carrying an adjustable weight, pivoted lugs upon the crank-arm and throw-bar, a pitman-rod pivotally connected to the lugs, suitable pivoted operating-levers, a strap connecting the levers at their inner ends, one of said levers being connected to the strap through slot and pin, a link pivotally connected to the strap and throw-bar, and a suitable guide for the throw-bar, substantially as and for the purpose set forth.

4. A swinging gate and means for operating the same, comprising suitable pivoted operating-levers connected together at their inner ends, a pivoted throw-bar carrying an adjustable weight and connecting with the levers, a crank-arm connecting with the gate, a pitman-rod connecting the crank-arm and the throw-bar together, a pivoted bell-crank upon the gate, a crank-rod connecting the bell-crank with one of the operating-levers, and a spring-actuated latch and rod connecting the latch with the bell-crank, substantially as and for the purpose described.

In testimony that I claim the above I have hereunto subscribed my name in the presence of two witnesses.

EDWIN ROBERTSON.

Witnesses:
  I. M. BUSBY,
  FRANK A. COX.